United States Patent [19]

Feichtinger

[11] Patent Number: 4,651,689

[45] Date of Patent: Mar. 24, 1987

[54] INTERNAL COMBUSTION ENGINE WITH FIRST ORDER MASS BALANCING

[75] Inventor: Gerhard Feichtinger, Graz, Austria

[73] Assignee: AVL Gesellschaft für Verbrennungskraftmaschinen und Messtechnik mbH. Prof.Dr.Dr.h.c. Hans List, Graz, Austria

[21] Appl. No.: 680,535

[22] Filed: Dec. 11, 1984

[30] Foreign Application Priority Data

Jan. 16, 1984 [AT] Austria ................................ 129/84

[51] Int. Cl.$^4$ .............................................. F02B 75/06
[52] U.S. Cl. ............................ 123/192 B; 123/90.31; 74/604
[58] Field of Search ............. 74/603, 604; 123/192 R, 123/90.27, 90.31, 192 B

[56] References Cited

U.S. PATENT DOCUMENTS

| | | | |
|---|---|---|---|
| 2,013,163 | 1/1935 | Meyer | 123/192 B |
| 2,284,515 | 5/1942 | Criswell | 123/192 B |
| 3,109,417 | 11/1963 | Bekkala | 123/192 B |
| 3,110,195 | 11/1963 | Hanley | 74/604 |
| 3,603,296 | 9/1971 | Mitchell | 123/90.31 |
| 3,763,716 | 10/1973 | Blomberg | 123/192 R |
| 3,888,217 | 6/1975 | Hisserich | 123/90.31 |

Primary Examiner—Carl Stuart Miller
Attorney, Agent, or Firm—Watson, Cole, Grindle & Watson

[57] ABSTRACT

The balancing weights of the engine are directly mounted on the camshaft which is driven from the engine crankshaft in a counter-rotational sense, using a pair of gears and a simple toothed belt. This simple design saves both space and weight.

1 Claim, 1 Drawing Figure

U.S. Patent  Mar. 24, 1987  4,651,689
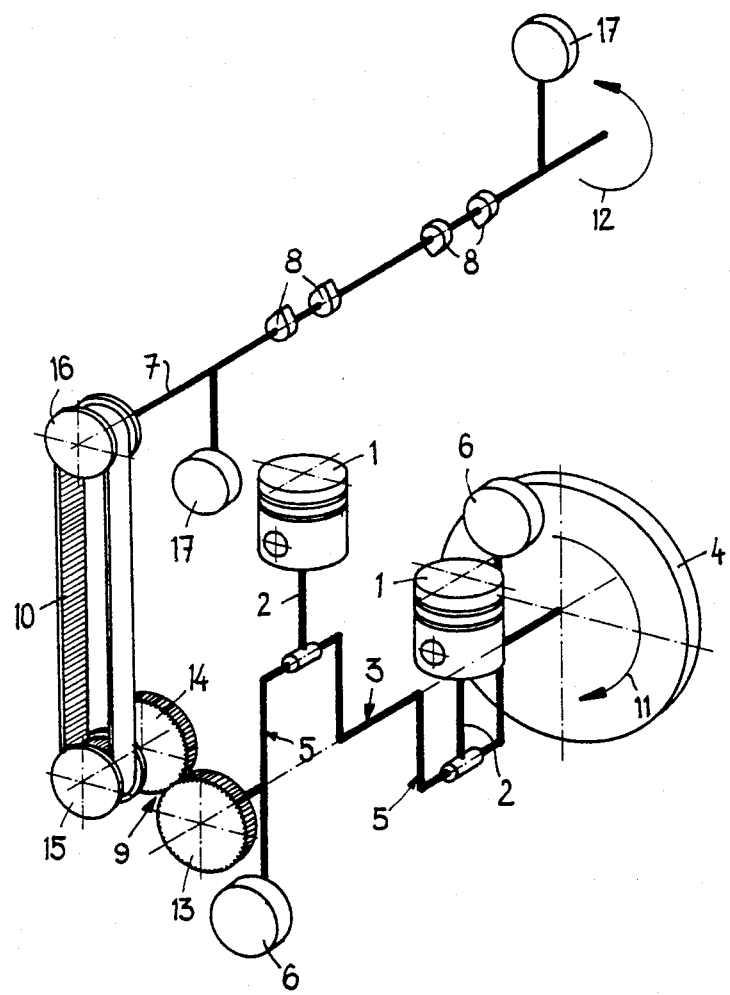

INTERNAL COMBUSTION ENGINE WITH FIRST ORDER MASS BALANCING

BACKGROUND OF THE INVENTION

The present invention relates to an internal combustion engine with first order mass balancing, comprising a crankshaft transforming the reciprocating motion of pistons and connecting rods into a rotary motion, and a camshaft driven from this crankshaft, and further comprising balancing weights which are rotatable around an axis parallel to the crankshaft axis and are driven by the crankshaft.

DESCRIPTION OF THE PRIOR ART

Combustion engines of this type have been known before, e.g., with their balancing weights being located at the side of the cylinder block, approximately in the area of the bottom ends of the cylinders, and mounted on a continuous shaft running along the length of the cylinder block, which shaft is driven, for instance, via a system of gears, from the front end of the crankshaft. The main disadvantage of such known arrangements is that, as a consequence of the defined distance and transmission ratios between the driven shaft carrying the balancing weights and the driving crankshaft, there is little freedom of choice in the design of the internal combustion engine, and that a comparatively complex assembly of shaft and gears will have to be provided at a front end of the engine for the purpose of mass balancing, which will not only influence costs but will also increase the overall weights and size of the combustion engine.

SUMMARY OF THE INVENTION

It is an object of the present invention to avoid the above disadvantages of the known types of assemblies and to improve an internal combustion engine of the afore-mentioned kind such that the oscillating inertial forces of the first order are efficiently balanced in a simple manner, and that the balancing mechanism can be driven from the crankshaft for saving both space and weight.

According to the present invention this is achieved by mounting the balancing weights on the camshaft which is driven from the crankshaft by a pair of gears and a toothed belt with single gearing, and rotates counter to the crankshaft. In this way the camshaft is simultaneously used for balancing the oscillating inertial forces of the first order, the necessary counter-rotation in the opposite direction of the crankshaft being achieved by a pair of gears between the driving crankshaft and the driven camshaft. The use of a simple toothed belt with single gearing offers a particularly advantageous way of driving the camshaft which is characterised by low cost and simplicity of design, entailing no such problems as locating the gear required for transmission purposes in the constructions mentioned before, and eliminating the usual concerns regarding the dependence between distance of driving and driven shaft on the one hand and transmission ratio on the other in the case of gearwheel drives.

In a further embodiment of the invention the balancing weights may be made integral with the camshaft, which will simplify production, assembly and maintenance of the combustion engine.

In another embodiment the balancing weights may be situated outside of the oil-wetted area around the cams or camshaft bearings, which will improve accessibility of the vital functional parts of the cam assembly, thus sinplifying design of the internal combustion engine.

In a still further embodiment of the invention one of the two gears effecting the reversal of the direction of rotation between crankshaft and camshaft, is directly attached to one end of the crankshaft, the other one being in direct contact with the driving gear of the toothed belt whose driven gear is mounted on the camshaft. This will ensure that the two gears required for reversing the direction of rotation of the crankshaft are positioned within the area of the crank assembly at the front end of the internal combustion engine, which is of great advantage from the point of view of design, as in this area the width of the engine is determined by the width of the crankcase anyway, which in turn is determined by the envelope of the connecting rod motion. Besides, if the cylinder block has to be removed from a separately configured crankcase, for instance, it will suffice to remove the toothed belt, which will facilitate maintenance of the internal combustion engine. The dimensions of the synchronous belt drive formed by the driving gear, driven gear and the toothed belt itself may be kept quite narrow, which will ensure that the width of the internal combustion engine need not be enlarged, not even in the area of the cylinder block and the cylinder head.

DESCRIPTION OF THE DRAWING

The invention will now be further illustrated by way of an example representing a two-cylinder, two-stroke engine of the inline type, with reference to the schematic drawing accompanying this description.

DESCRIPTION OF THE PREFERRED EMBODIMENT

The reciprocating movement of pistons 1 in cylinders (not shown) during operation of the depicted engine is transformed into a rotational motion via connecting rods 2 and a crankshaft 3, which rotational motion may be delivered by the crankshaft in a manner not shown, for instance, on the side of a flywheel 4, or on the opposite side, in order to drive further assemblies or engines connected to it.

In the example shown here the crankshaft 3 has two cranks 5 which are 180 degrees apart, and is provided with counterweights 6 whose centers of gravity again are situated in the plane of the cranks 5.

Inlet and outlet valves of the cylinders of the internal combustion engine, which are also not shown here, are controlled by an overhead camshaft 7, with two cams 8 for each cylinder, whose special function need not be discussed in this context. The camshaft 7 is driven counter-rotationally (cf. arrows 11, 12) from that end of the crankshaft 3 which is opposite the flywheel 4, by means of a pair of gears 9 and a simple toothed belt 10 with single gearing. One gear 13 of the pair of gears 9 reversing the rotation between crankshaft 3 and camshaft 7 is directly attached to an end of the crankshaft 3; the other gear 14 of the pair of gears 9 is directly connected with a driving gear 15 of the toothed belt 10 by means of a shaft (not shown), the driven gear 16 of belt 10 being mounted on the camshaft 7.

On camshaft 7, outside of the area around the cams 8 and the camshaft bearings (not shown) that is immediately oil-wetted during operation, two balancing weights 17 are mounted which, in the variant presented, are integral with the camshaft 7. Since in this variant a two-cylinder, two-stroke internal combustion engine with a two-throw crankshaft is used (the cranks being 180° apart in the same plane), the number of revolutions of the camshaft 7, serving as a balancing shaft at the same time, equals that of the crankshaft 3, and the balancing weights 17 correspond to the counterweights 6 on the crankshaft 3 with regard to their rotational angle, whereas they are 180° out of phase with the corresponding throws 5 of the crankshaft. This is due to the special design of the internal combustion engine and its crank assembly, other engine configurations being quite conceivable within the limits of the invention, of course.

The arrangement presented in the drawing shows that the method of driving the camshaft 7 serving as a balancing shaft from the crankshaft 3 in a counter-rotational sense by means of a pair of gears 9 and a toothed belt 10 is a simple solution, saving both space and weight.

I claim:

1. A two-cylinder, two-stroke internal combustion engine of the in-line type with first order mass balancing which includes a crankshaft that rotates around a first axis of rotation, counterweights mounted on said crankshaft, two pistons which move towards and away from said first axis of rotation, two connecting rods which respectively connect said two pistons to said crankshaft to rotate said crankshaft around said first axis of rotation, a single balanced shaft mounted over said crankshaft, said single balanced shaft being an overhead camshaft that rotates around a second axis of rotation which is parallel to said first axis of rotation, balancing weights mounted on said camshaft, and a gear system interconnecting said crankshaft with said camshaft such that said camshaft rotates oppositely to said crankshaft; said gear system including a first gear connected to said crankshaft, a second gear engaged with said first gear, a third gear connected to said camshaft, and a toothed belt connected between said second gear and said third gear.

* * * * *